UNITED STATES PATENT OFFICE.

HEINRICH VOLLBRECHT AND CARL MENSCHING, OF BUFFALO, NEW YORK, ASSIGNORS TO THE SCHOELLKOPF ANILINE AND CHEMICAL COMPANY, OF SAME PLACE.

ALPHANAPHTHOLSULPHONIC ACID.

SPECIFICATION forming part of Letters Patent No. 333,040, dated December 22, 1885.

Application filed January 13, 1885. Serial No. 152,809. (Specimens.)

*To all whom it may concern:*

Be it known that we, HEINRICH VOLLBRECHT and CARL MENSCHING, of the city of Buffalo, in the county of Erie and State of New York, have invented new and useful Improvements in the Manufacture of Color-Producing Acids, of which the following is a specification.

In nitrating alphanaphthalinemonosulphonic acid, which acid is made in the usual manner, two nitromonosulphonic acids are formed, which, after being converted into their amido compounds by known methods, result in two new naphthylaminesulphonic acids. These can be easily separated on account of the unequal solubility of their salts in water.

The acid whose sodium salt is easily soluble in water is the raw material for the production of our new color-producing naphtholmonosulphonic acid.

In producing this new naphtholmonosulphonic acid we dissolve two hundred and forty-five pounds of the sodium salt of the described naphthylaminemonosulphonic acid in about four thousand pounds of water, and add to it one hundred and fifty pounds of sulphuric acid of 66° Baumé. We cool this down to 5° centigrade, and add slowly seventy pounds of sodium nitrite dissolved in three hundred pounds of water. The mixture is left now at rest for twenty-four hours. When the diazo compound of said naphthylaminesulphonic acid is formed, we pour it slowly into boiling water, to which a small quantity of sulphuric acid is added. Then we boil with steam until the reaction is finished.

The soda salt of the newly-formed naphtholmonosulphonic acid is now prepared by any known method, and can be used directly for producing coloring-matter.

Our new color-producing naphtholmonosulphonic acid shows characteristic differences from all hitherto known naphtholmonosulphonic acids, principally by reaction upon the diazo compound of the benzol series and upon alpha and beta naphthylamine. For instance, all known naphtholmonosulphonic acids produce, when combined with diazobenzol, dyes or coloring-matters of an orange color, while our new acid produces with diazobenzol a bright scarlet dye.

All known naphtholmonosulphonic acids produce, when combined with diazotoluol, an orange-colored dye having a red shade, while our new acid produces with diazotoluol a very bluish scarlet.

With alpha and beta naphthylamine our new acid produces dyes differing similarly in color from the dyes produced by the combination of the hitherto known naphtholmonosulphonic acids with alpha and beta naphthylamine.

We claim as our invention—

As a new article of manufacture, a color-producing acid consisting of a new naphtholmonosulphonic acid, as herein described, being a derivative of the herein-described naphthylaminesulphonic acid, and having the qualities herein set forth.

Witness our hands this 3d day of December, 1884.

H. VOLLBRECHT.
C. MENSCHING.

Witnesses:
JNO. J. BONNER,
C. F. GEYER.